March 18, 1969   H. T. WAITE, JR   3,433,103
PUNCHING T
Filed Dec. 30, 1965
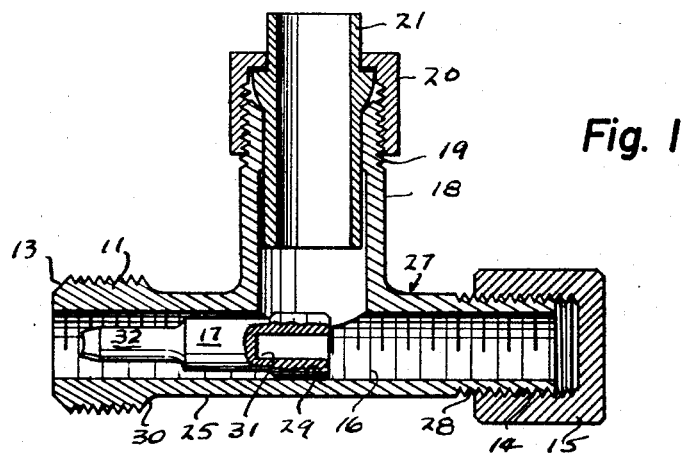
Fig. 1
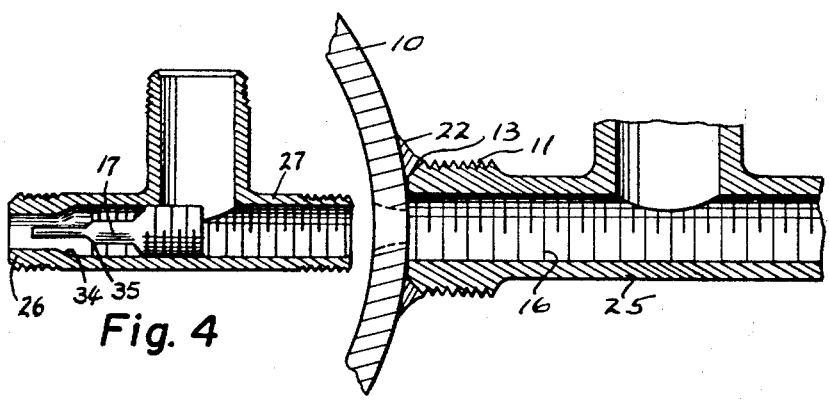
Fig. 2
Fig. 4
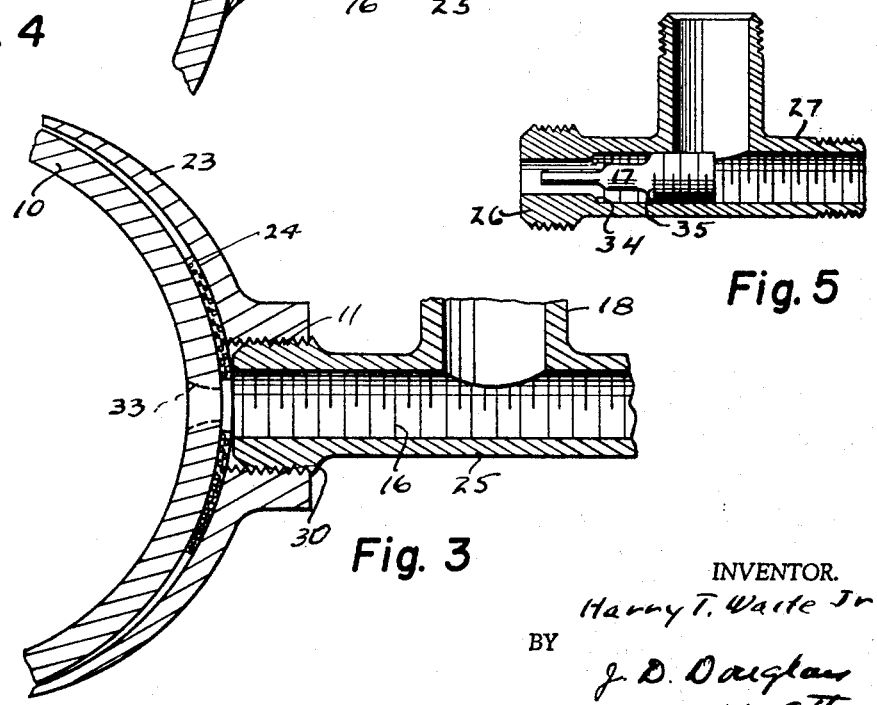
Fig. 5
Fig. 3
INVENTOR.
Harry T. Waite Jr
BY
J. D. Douglas
His atty United States Patent Office 3,433,103
Patented Mar. 18, 1969

3,433,103
PUNCHING T
Harry T. Waite, Jr., South Bend, Ind., assignor to The Fanner Manufacturing Company, a division of Textron Inc., Cleveland, Ohio, a corporation of Rhode Island
Filed Dec. 30, 1965, Ser. No. 517,646
U.S. Cl. 77—38                    6 Claims
Int. Cl. B23b 41/12; F16k 43/00; F16l 55/18

ABSTRACT OF THE DISCLOSURE

A punching T fitting having an enlarged threaded wall portion that terminates in a frusto-conical end. The enlarged wall allows the end to be welded to the container to be tapped without materially weakening the fittting. Alternatively, the threaded portion allows the fitting to be threaded into a saddle. Thus, a single fitting may be used either for welding applications or threaded applications. The thickening or enlargement of the wall may be either internally or externally, or both. When the thickening is internally the internally thickened portion may be shaped to coact with the punch to provide a seat to shut off the flow of the fluid.

---

The invention relates to a fitting for perforating steel walled members, such as pipes and fluid containers, and is particularly well suited for use as a branch pipe fitting commonly called a punching T-fitting. Examples of prior art and their operation are described in Patent No. 2,950,- 637 of Aug. 30, 1960; and 2,990,731 of July 4, 1961.

Punching T-fittings are used to make taps or service connections into fluid containers such as high pressure gas lines. There are two common varieties of punching T-fittings whose distinguishing characteristics differ only in the manner by which they are secured to the containers prior to punching a tap. The first variety is secured to the container by welding the fittting thereto. This type of fitting is provided with a beveled edge suitable for a welding operation. The second variety is secured to the container by threading the fitting into a saddle which is affixed to the container for this purpose. This second type of fitting is provided with a screw thread suitable for such a saddle connection.

Both varieties of punching T-fittings are common in use. The actual selection of fitting to be used depends on various factors such as equipment availability, utilization of the tap, and container accessibility, design, and contents. Although such a selection is often made at the site in the field, it may be made in a field or local office. In either case it is necessary to stock each of the two varieties and to transport with the service crew in the field each of the two varieties. Such a necessity is costly in terms of manufacturing, purchasing, stocking and field service transporting. It is apparent that it would be highly desirable to have one stock punching T-fitting that could be secured to a container by either welding or threading into a saddle and thus eliminate the need for the two different fittings. For trade acceptability, such a fitting with a dual securing means would have to be so conceived that the advantages gained were not offset by any design, cost, weight, or operational disadvantages. Heretofore, it was not known how to accomplish such a task. If the punching T-fitting that is beveled for a welded connection was screw threaded so that it might be used in a saddle connection, then the resultant fitting was structurally weakened so as to seriously impair the quality of the connection achieved when the fitting was secured to the container. The same result occurred when the punching T-fitting that is screw threaded for a saddle connection was appropriately beveled to allow for a welded connection. On the other hand, if the punching T-fitting was exteriorly enlarged such that the combination of the bevel and the screw threads did not impair the quality of the connection, then the corresponding increase in material and weight, and therefore cost, were a sufficient disadvantage in the highly competitive fitting manufacturing field to offset the advantage gained through the dual securing means.

This invention enables an economical punching T-fitting to be made which can be secured to a container with either a welded or a saddle connection, thereby eliminating the problems associated with the manufacture, sales, purchase, and stocking of two different varieties of fittings which, after connection, perform the same function. At the same time this invention does not have associated therewith any offsetting disadvantages of material, weight, or cost. In fact, this invention not only provides the dual securing means capability, but in addition enables certain beneficial changes to be made in the interior of the punching T-fitting which both improve the operation of the fitting after it is secured to the container and render more economical the manufacture of the punching T-fitting.

This invention, as well as the several advantages provided thereby, will become more apparent from the following description which is illustrated by the accompanying drawings, of which:

FIG. 1 is a longitudinal section view of the invention;

FIG. 2 is an enlarged fragmentary detail section view illustrating the invention used with a welded connection to a container;

FIG. 3 is an enlarged fragmentary detail section view illustrating the invention used with a saddle connection to a container;

FIG. 4 is a longitudinal section view showing an alternative embodiment of the invention; and FIGURE 5 is a longitudinal sectional view showing a modification of the embodiment of FIGURE 4.

In the drawings, like parts have been designated by like reference characters.

Referring to the drawings wherein the invention has been illustrated as a branch pipe fitting for use on high pressure fluid lines, such as high pressure gas lines containing gas at pressures of from forty pounds to one hundred and twenty pounds per square inch, or more, the numeral 10 designates the pipe container.

Briefly my invention contemplates a punching T-fitting 27 with an enlarged threaded portion 11 that terminates in a frusto-conical end portion 13 that is arranged for welding to the container 10, said enlarged threaded portion being arranged to be threaded into a saddle and providing a thickened part that is not weakened upon welding.

The punching T-fitting has an open ended tubular portion 25 and a branch or T portion 18 that projects laterally from an intermediate portion of the conduit 25. The branch portion may be provided with external screw threads 19 arranged to receive a cap or outlet connection as exampled by the compression outlet 21 and compression outlet cap 20. This type of outlet connection is presented only as an example and the branch may be provided for any desired type of outlet connection or combinations of types as will be seen to have been made possible by this invention. The end portion 28 of the conduit portion 25 of the fitting opposite the beveled end 13 thereof is externally screw threaded at 14 to receive a sealing cap 15. The other end portion 30 of the conduit portion 25 of the fitting is provided with an enlarged threaded portion 11, said threaded portion being arranged to be threaded into a saddle 23, as shown in FIG. 3.

In FIG. 3, which utilizes the same fitting pictured in

FIGS. 1 and 2, the fitting is provided with an externally enlarged threaded portion 11. By making the enlargement external, the interior or bore of the conduit portion 25 of the fitting may be made with substantially a constant diameter throughout its length and hence may be provided with screw threads 16 throughout its length for reasons which will become apparent later on.

The saddle, usually called a service saddle is clamped on the container 10 and may utilize a gasket 24 for improved seating. This method of securing the fitting to the container shown in FIG. 3 is one of the securing capabilities provided for in this invention. The enlarged threaded portion 11 terminates in a beveled or frusto-conical end portion 13. Said frusto-conical end portion 13 is arranged for welding to the container 10 as shown by the weld 22 in FIG. 2. In the form shown, the arrangement will preferably be to accommodate welding thereof at 22 to the container 10 to extend substantially perpendicular to the container portion to which it is welded and, as shown, to extend substantially radially of the container 10. The weld 22 extends circumferentially around the member 11 to provide a fluid-tight or sealed joint.

In FIG. 2, which utilizes the same fitting pictured in FIGS. 1 and 3, the threaded portion 11 provides a thickened part which is not weakened upon welding. This method of securing the fitting to the container 10, shown in FIG. 2, illustrates a second securing capability provided for by this invention.

In the embodiment of the invention described above, FIGS. 1, 2 and 3, the threaded portion 11 is enlarged externally. In this manner the interior of the conduit portion 25 of the fitting may be of substantially constant diameter throughout its length and may be provided with screw threads throughout its length without causing any detrimental weakening of the fitting. These interior screw threads 16 are arranged to receive an externally threaded punching member 17. This punching member, shown in FIG. 1, has an elongated portion 29 at one end thereof which is screw threaded in the conduit portion 25 meshing with the threads 16. A hexagonal or other non-circular tool receiving socket 31 is preferably formed in the end of the portion 29 to receive a tool for rotating the member. The punching member 17 is arranged with a punching portion 32 opposite the threaded end 29 thereof. After the punching T-fitting is secured to the container, the punching member 17 is rotated so as to advance it toward the container. A sufficient rotation of the punching member will cause the punching portion 32 to punch an opening in the container as shown by the dotted lines 33 in FIGS. 2 and 3. By providing the internal portion of the conduit 25 with screw threads throughout its length, the length of the threaded portion of the conduit does not restrict the design of the punching member 17. Because the threads run throughout the length of the conduit portion 25, the punching member may be made as short as desired, thus leading to reduced costs in manufacture and to greater strength and reliability in operation.

An alternative embodiment of the invention is shown in FIG. 4 where the threaded portion 26 is internally enlarged rather than externally enlarged as was done in FIGS. 1, 2, and 3. When the threaded portion 26 of the fitting is internally enlarged, there is provided an internal terminating portion 34 of the internally enlarged threaded portion 26. This terminating portion may be arranged as a seat to match with a tapered portion 35 of the punching member 17 located intermediate the ends thereof. This seat may be used to stop the flow of fluid from the container through the fitting after an opening has been punched by merely rotating the punching member 17, thus causing it to advance until the tapered portion 35 of the punching member seats on the seat 34. In prior punching T-fittings it was possible to use the punch to seal off the bore by advancing the punch member until it seated against the container, as shown in FIG. 6 of Patent No. 2,950,637 of Aug. 30, 1960. In that arrangement, however, the punch seated against the container causing the stresses in the means used to secure the fitting to the container. In this invention, by seating the punch against the designed seat 34 in FIG. 4, an improved seal at reduced pressure is achieved without placing any stress in the securing means. FIGURE 5 shows a modification of the embodiment of FIGURE 4 wherein the threaded portion 26 is both internally and externally enlarged.

While the preferred embodiments of the invention have been illustrated and described it will be understood that the threaded portion may be both externally and internally enlarged and that other changes in the construction may be made within the scope of the appended claims without departing from the scope and spirit of the invention.

I claim:

1. A punching T for attachment to a fluid conducting line comprising a body formed with internal threads, a threaded punch means disposed in the body and movable therein, said body having an end formed for attachment to said line and comprising an exteriorly threaded enlarged wall portion terminating in a frusto-conical end portion, said frusto-conical portion being arranged for welding to said line and said threaded portion providing a thickened part which is not weakened upon welding and arranged to be threaded in a saddle.

2. A device as described in claim 1, wherein said enlarged threaded portion is exteriorly enlarged.

3. A device as described in claim 1, wherein said enlarged threaded portion is interiorly thickened.

4. A punching T for attachment to a fluid conducting line comprising a body formed with internal threads, a threaded punch means disposed in the body and movable therein, said body having an end formed for attachment to said line and comprising an exteriorly threaded portion terminating in a frusto-conical end portion, said frusto-conical portion being arranged for welding to said line and said threaded portion providing a thickened part of reduced internal diameter extending from the end to a point spaced from the end which is not weakened upon welding and arranged to be threaded into a saddle and with the inner end of said thickened portion provided with a seat and said punching means being provided with a seat engaging portion.

5. A device as described in claim 1 wherein said threaded portion is both interiorly and exteriorly thickened.

6. A device as described in claim 4 wherein said exteriorly threaded portion is also thickened exteriorly.

References Cited

UNITED STATES PATENTS

| 3,038,490 | 6/1962 | Yocum | 137—318 |
| 3,247,862 | 4/1966 | Burke | 137—318 |
| 3,252,474 | 5/1966 | Ehrens et al. | 137—318 |

GERALD A. DOST, *Primary Examiner.*

U.S. Cl. X.R.

29—157; 137—318; 339—244; 151—69